No. 699,569. Patented May 6, 1902.
W. RENFREW.
LACING BUTTON.
(Application filed Dec. 4, 1900.)
(No Model.)
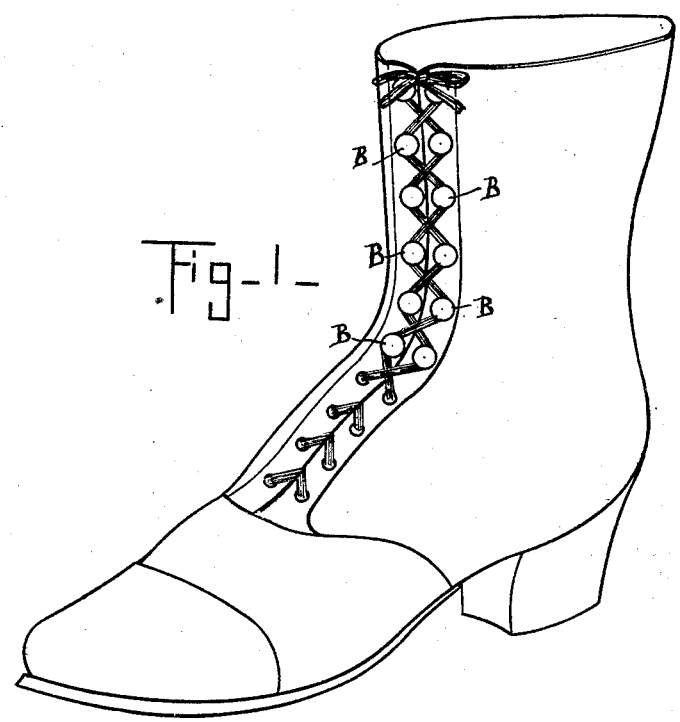
Fig-1-
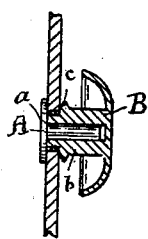
Fig-4-
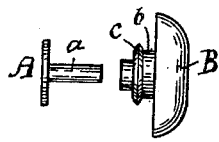
Fig-2-
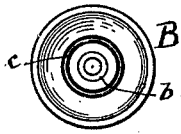
Fig-3-
Witnesses:
H. B. Davis.
Florence A. Planta
Inventor:
William Renfrew
by Edwin Planta
attorney

United States Patent Office.

WILLIAM RENFREW, OF CHELSEA, MASSACHUSETTS.

LACING-BUTTON.

SPECIFICATION forming part of Letters Patent No. 699,569, dated May 6, 1902.

Application filed December 4, 1900. Serial No. 38,671. (No model.)

*To all whom it may concern:*

Be it known that I, WILLIAM RENFREW, a citizen of the United States, and a resident of Chelsea, in the county of Suffolk and State of Massachusetts, have invented certain new and useful Improvements in Lacing-Buttons, of which the following is a specification.

It is a well-known fact that ladies' laced boots are almost invariably provided with eyelets the entire length instead of being partly provided with the hooks which are always used on men's shoes, for the reason that the hooks catch in the skirts to such an extent as to render them objectionable.

The object of my invention is to provide a lacing-stud which may be readily attached to the eyelet of a shoe, so that it may be as firmly connected thereto as if it were integral therewith, and which is so shaped that it will not catch in the skirts. I accomplish this object by producing a stud which is made up of two parts, consisting of a mushroom-shaped head having a hollow stem which rests on the face of the eyelet to which the stud is attached or enters the same slightly and a shank having a solid stem which is of slightly-greater diameter than the internal diameter of the hollow stem, so that when it is forced into the latter as far as possible the two will be firmly connected and the shank and hollow stem will firmly engage opposite sides of the eyelet.

Referring to the accompanying drawings, Figure 1 represents a perspective view of a lady's laced shoe fitted with my improved buttons. Fig. 2 represents a side view of the two portions of a button constructed according to my invention. Fig. 3 is an under side view of the button portion. Fig. 4 is a sectional view of the button applied to a shoe.

The stud consists of the top or main part B, having a round head of mushroom shape and a hollow stem $b$, which is integrally secured to said head on its under or concave side, and a shank A, having a projecting solid stem $a$, which is slightly tapered at the end. The extreme end of stem $a$ is of such a size that it will readily enter the hollow stem $b$; but beyond this point it is of slightly-greater diameter than the internal diameter of stem $b$, so that when it has been forced therein a short distance it will fit tightly and when it is forced still farther it will expand the stem $b$ slightly, connecting both stems firmly and permanently. As the stem A will be forced into stem $b$ until the shank A and stem $b$ are drawn against opposite sides of the eyelet, the parts of the stud will then be firmly connected thereto.

As shown in the drawings, the stem $b$ may be provided with a small flange or enlargement $c$ within a short distance of its end, so that said flange may rest against the face of the eyelet when the two parts of the stud are connected, thus enabling one size of stud to be secured to different sizes of eyelets. By having the stem $b$ pass into the eyelet a short distance, as shown in Fig. 4, the stud will be more rigidly secured to the eyelet, especially if the stem should just fit the eyelet before the stem $a$ is forced therein, so that the stem $b$ will be expanded against the inside of the eyelet.

It will be obvious that as eyelets are usually of not more than two different sizes it will be a simple matter to make the studs in corresponding sizes, so that the hollow stem will fit closely into the eyelet before it is expanded by the stem $a$. The stem $a$ will be made of such size that it will pass through the smallest-sized eyelets which are ever used. The number of eyelets which will be fitted with these studs will obviously depend on the wishes of the purchaser of the shoe, and they are designed to be used in precisely the same way as the ordinary lacing-hook, as shown in Fig. 1. The heads of the studs are of such shape that they will not catch in the skirts of the wearer.

What I claim is—

1. In combination with an eyelet, a stud consisting of a head having a hollow stem projecting from its under side, said stem being of such a size that it will rest against said eyelet without passing therethrough, a shank having a head of larger size than the eyelet-hole and a stem which is adapted to pass through the eyelet and into said hollow stem, the diameter of said shank-stem being greater than the internal diameter of said hollow stem, so that when one stem is forced into the other the shank and top may be permanently held together by the frictional engagement between the stems, and they may engage opposite sides of the eyelet so as to be firmly held therein.

2. In combination with an eyelet, a stud having a hollow stem projecting from its under side, an annular enlargement on the outer side of said stem and near its end which is adapted to rest against the outer face of said eyelet, the portion of said stem beyond said enlargement being adapted to fit said eyelet but not extend entirely therethrough, a shank having a head which is adapted to rest against the inner face of said eyelet, a stem which extends therefrom and is adapted to pass through said eyelet into said hollow stem, the diameter of said shank-stem being slightly greater than the internal diameter of said hollow stem, so that when the one is forced into the other the two will be held together firmly by frictional engagement, and the ends of the hollow stem may be expanded against the sides of the eyelet, said shank-stem being forced into said hollow stem a sufficient distance to cause said shank and the flange of the top to firmly engage opposite sides of the eyelet.

In testimony whereof I have affixed my signature in presence of two witnesses.

WILLIAM RENFREW.

Witnesses:
CHAS. STEERE,
EDWIN PLANTA.